United States Patent Office 3,472,700
Patented Oct. 14, 1969

3,472,700
ELECTROLYTE-WETTABLE STORAGE BATTERY SEPARATORS AND PROCESS FOR FORMING SAME
Robert C. Kollman, Hightstown, William D. Lang, Rahway, and Dominic Simone, Highland Park, N.J., assignors to National Lead Company, New York, N.Y., a corporation of New Jersey
No Drawing. Filed Mar. 1, 1967, Ser. No. 629,051
Int. Cl. H01m 3/02
U.S. Cl. 136—146     15 Claims

ABSTRACT OF THE DISCLOSURE

Storage battery separators containing reaction product of anionic and cationic materials as wetting agent.

BACKGROUND OF THE INVENTION

This invention relates to storage batteries. In particular, this invention relates to electrolyte wettable separators for use in conventional and dry charged storage batteries of the lead-acid type.

In the manufacture of storage batteries, it is customary to place a separator between the positive and negative plates to maintain a fixed, uniform spacing and prevent contact between the plates. Since the separator, with the plates, is submerged in the electrolyte, the separator must be inert to the chemical actions within the battery and must withstand the destructive action of the electrolyte. Moreover, it must be ionically permeable in order to permit the flow of charge-carrying ions between the positive and negative plates, and sufficiently porous to permit easy flow of electrolyte, but free of pinholes or straight passages which would permit the migration of minute particles or active material which become dislodged from the positive plate. If permitted to migrate to the negative plate, such particles deposit thereon, building up excrescences or trees which bridge the space between the plates and short-circuit the battery, thereby causing premature battery failures.

Numerous attempts have been made to form separators which will fulfill these requirements. To a large extent, while such attempts have met with some degree of success, the separators produced have resulted in a a sacrifice of one property in order to improve another. For example, current battery practice dictates the use of separators which contain or are formed of hydrophobic polymeric materials. Such separators may, among other things, meet the requirement of being chemically inert in the environment of a storage battery, but being hydrophobic are not readily wet by the electrolyte. Therefore, to assure free flow of electrolyte through such separators a wetting agent must be added.

With respect to dry charged batteries, it is currently also necessary to add a second complement of wetting agent to the system when the battery is ultimately put into use. Such batteries are manufactered by a process which incolves electrochemically "forming" the battery cells by adding sulfuric acid and subjecting the cells to electric current. After the cells are formed and charged, the acid is drained off and the cells' components are thoroughly washed and dried and assembled into a battery. The washing is essential, because if the sulfuric acid electrolyte is left in the cells, the separators will char during drying and there may also be a tendency for the plates to lose charge on standing. During the washing step, however, the wetting agent initially added is effectively removed, so that, once dried, the separators revert to the hydrophobic condition and accordingly, an additional treatment with wettings agent is necessitated when the battery is eventually activated by the addition of electrolyte.

The added costs, increased margin of errors and percentage of inoperative and unacceptable separators stemming from such conventional wetting operations has restricted full utilization of the normally hydrophobic separators, such as porous plastic, glass and paper based separators, in conventional batteries and, particularly, in dry charged batteries.

SUMMARY OF THE INVENTION

In view of these deficiencies of conventional separators, it is an object of this invention to provide an improved electrolyte-wettable storage battery separator. Another object is to provide a separator for dry charged batteries that exhibits initial wettability and retains its wettability, without a second or supplementary addition of a wetting agent. Yet another object is to provide a method for converting a normally hydrophobic separator to a substantially permanent hydrophilic separator.

Broadly, the above and other objects of this invention are realized by treating a battery separator during any stage of its fabrication with an anionic reagent and a cationic substance which, when brought together, react to form a superior wetting agent on the separator and render the separator substantially continuously hydrophilic.

DESCRIPTION OF THE PREFERRED EMBODIMENTS

The wetting agent according to the present invention may be used to impart wettability to any of the conventionally used battery separators. These include separators formed of cellulosic fibers containing polymers and resins, such as phenolformaldehyde, porous rubber, polyethylene and polystyrene separators.

Another separator for which the novel wetting agent is applicable, is disclosed and described in U.S. Patent 3,121,658 and comprises a porous body of interfelted fibers wherein each of the fibers comprises a discrete particle, fiber, or filament of cellulosic material encased in a shell of a polymer, such as polyethylene, with the whole being held together by fusion of the fibers at their points of contact. The polymer encased cellulosic fibers may be formed by suspending cellulosic fibers in a liquid medium, such as toluene, treating the fibers with a transition metal catalyst component, such as titanium tetrachloride and with an organo-metallic catalyst component, such as triethylaluminum, adding monomer, for example, ethylene, and polymerizing the monomer in situ on and about the surface of the cellulosic fibers.

The resulting free-flowing discrete fibers may then be processed into a separator by using paper-making techniques. According to one such procedure, sufficient water is added to the polymer encased fibers to form a slurry of about 4%–6% solids and after the fibers are well dispersed, the slurry is diluted to a consistency of about 1% solids and formed as a continuous sheet on a paper-making wire to give a wet web of from 0.09 to 0.120″ thick on the wire after the water is filter off. The formed web is dried and sintered by heating the web sufficiently to soften the encasing polymer surface throughout the web but without permitting the polymer to flow. The sintered web is then compressed and set to the desired thickness and density and, if desired, embossed with ribs.

Optional ingredients which may be added during such a process, include up to 10% of raw kraft fibers (Cedanier) to facilitate handling of the wet sheet; about 2% diatomaceous silica (Hyflo) to improve dispersion of the fibers; about 1 to 4% aluminum sulfate (papermakers' alum) to deter foaming on the paper-machine formation wire; and about 0.2 to 0.5% of a dispersing agent (Marasperse, Ceron CN or Tamol-N) to provide a well-dispersed slurry (all percentages being weight percentages based on the weight of the encased fibers in the slurry).

The reacting, wetting agent producing components according to the present invention usually are solids or viscous liquids. To provide for sufficient and uniform coating of a separator or separator-forming materials, the components must be dissolved or well dispersed in a liquid medium when they are applied. Any suitable diluent, such as water or an organic solvent such as toluene or methanol, may be used. However, water or an aqueous liquid must ultimately be present in the system to initiate and promote the reaction between the two components. Therefore, where one of the components of a selected combination of wetting agent components is difficultly soluble or dispersible in water, it is preferred to add that component initially to separator-forming fibers by employing any appropriate low boiling organic liquid as a solvent, mixing the solution with the fibers and distilling off the solvent. This results in the precipitation of the initial component on the fibers and is thus available for reaction with the subsequently added aqueously dispersed or dissolved second component.

Separators may be subjected to the components during any stage of separator fabrication, provided that subsequent processing conditions or additives do not adversely influence or affect the components, their reaction, and the reaction product.

Processed separators may be dipped or mist-sprayed with the wetting agent components. It is preferred, however, to render a separator hydrophilic by treating separator-forming materials, such as polyethylene encased cellulosic fibers, while such materials are in a well dispersed stated. This provides maximum available and receptive surfaces on which the anionic reagent and cationic substance can react and impart optimum continuous wettability to a separator. Such a procedure also avoids the additional drying operation necessitated in treating processed separators which were initially wet slurried and dried.

During a separator formation process as outlined above with reference to paper-making techniques, it is convenient to add the wetting agent components to the slurried fibers before the slurry is diluted and transferred to the web formation wire.

It is preferred to add unreacted wetting agent components to the fibers in a stepwise fashion. By first adding one component and then the remaining component, optimum uniform wetting of the fibers is assured and, at the same time, formation of the wetting agent reaction product apart from the fibers is prevented.

Either the cationic substance or the anionic reagent may be initially added. Prior to the addition of the remaining component it is desirable to first permit the initial component to become intimately associated with the fibers by, for example, mixing the treated fibers for about 5 minutes. Such a procedure facilitates the formation of substantially all of the reaction product of the components on and about the fibers.

The wetting agent components appear to become fixed on the fibers either physically or by ionic forces. Although not wishing to be bound by an mechanism of operation, it is believed that the diluted initial component is primarily fixed to the fibers by adsorption or absorption and, being ionically charged, draws to it the second component of opposite charge with the result that the electrochemical reaction between the components occurs only at and on the surface of the fibers Accordingly, when treating fibers having a substantial inherent or applied ionic charge, the wetting agent component of opposite charge may be added first to facilitate the fixation of the components, and thereby the formed complex reaction product, to the fibers. Routine preliminary tests can be used to determine which component has the greater affinity to a particular type of fiber.

The nature of the reaction product of many cationic and anionic components can be controlled to some extent by the concentrations at which they are used. It has been found that when very dilute concentrations of the components are slowly admixed, the resulting precipitated complex does not agglomerate but rather forms a colloidal solution. A similar result can also be obtained by carefully mixing relatively concentrated (about 1–2%) solutions or dispersions of the components provided that one component has emulsifying or dispersing powers and is added significantly in excess of the stoichiometric amount necessary to react with the other component.

Although not preferred methods of treatment, employing either of these procedures it is possible to add the wetting agent components simultaneously to fibers or first form the reaction product apart from the fibers and subsequently treat dispersed fibers with the colloidal complex wetting agent and affix it on and about the fibers.

The cationic and anionic components operable in the practice of this invention are those yielding an anionic-cationic complex wetting agent which is substantially insoluble in water; compatible with and substantially insoluble in battery electrolyte; rapidly wettable by the electrolyte; stable to the temperatures encountered during separator fabrication, cell formation and battery operation; reasonably hydrophilic; resistant to redispersement; innocuous to battery environmental operating conditions and reagents; resistant to steam distillation during separator fabrication; substantially non-foaming and non-frothing; substantive to fibers; and which maintains low electrical resistance and provides high dry charge capacities.

By way of illustration, the following are representative applicable anionic and cationic components, listed by their proprietary (used in the examples) and corresponding known chemical names, which may be used in the practice of the present invention.

Anionic Reagents:

| | |
|---|---|
| Aerosol 18 | Disodium - N - octadecyl sulfosuccinamate. |
| Aerosol OT | Sodium di(2-ethylhexyl) sulfosuccinate. |
| Alconate | Petroleum sulfonate. |
| Avitone SR | Long chain hydrocarbon sulfonate. |
| DDBSA | Dodecylbenzene sulfonic acid. |
| Nacconal NR | Sodium kerylbenzene sulfonate. |
| Nekal BX–78 | Sodium dibutylnaphthalene sulfonate. |
| Nekal WS–25 | Sodium dialkyl sulfosuccinate; analysis of material identifies it as sodium di(2,6 dimethyl 4 heptyl) sulfosuccinate. |
| Phi-O-Sol WA | Sodium salt of sulfated butyl oleate. |
| Sipex TDS | Sodium tridecyl sulfate. |
| Ultrawet K | Sodium dodecylbenzene sulfonate. |
| Sulframin 1288 | Dodecylbenzene sulfonic acid. |

Catonic Substances:

| | |
|---|---|
| Alkaterge | Alkylolamine-fatty acid condensate. |
| Armeen M2HT | Methyl di-hydrogenated tallow tert-amine. |
| Catanac SN | Stearamide propyl di-methyl b-hydroxyethyl ammonium nitrate. |
| Nopco 1425C | N(poly) ethoxylated fatty amine. |
| Nopco DE–126 | Ethoxylated quaternary alkylaryl fatty amine hydrochloride. |
| Genamid 250 and 2000 | Polyamide containing reactive amino groups; reaction product of dimerized linoleic acid and a polyamine, such as ethylene diamine. |

Versamid 115, 125, and 140 _____ Polyamide containing reactive amino groups; reaction product of dimerized linoleic acid and a polyamine, such as ethylene diamine.

Applicable cationic substances also include partial sulfate salts of polyethyleneimines. These substances are formed by treating an aqueous solution of a polyethyleneimine, such as ET-723, Chemicat P 124A and Polymin P, with dilute sulfuric acid until a pH of about 4.5 is reached.

The cationic and anionic components are used most conveniently in the form of salts. A cationic substance, made of commercially available in free base form, may be converted to a salt by reaction with a salt forming material, such as a Lewis acid, either prior to its addition to separator fibers or during its exposure to the fibers. Anionic reagents in free acid form may be converted to salts by reaction with an suitable alkaline material.

In addition, cataionic substances in free base form and anionic reagents in free acid form can be employed together to form in situ the anionic-cationic complex wetting agent.

The above listed components properly employed react to form a complex wetting agent meeting the requisite wetting agent characteristic and properties. It is to be understood however, that other known cationic and anionic materials which are productive of a wetting agent exhibiting the characteristics and properties hereinbefore detailed, may be utilized in the practice of this invention and are deemed encompassed therein.

In view of the numerous combinations of cationic substances and anionic reagents which may be employed, no encompassing limits with respect to amounts of addition or relative ratios can be prescribed. In general, the wetting agent complex reaction product should be present in an amount which is sufficient to impart to separators the desired properties without impairing battery performance. The examples will serve as an effective guide to those skilled in the art as to the amounts which should be used.

In order to illustrate more fully the nature of this invention and the manner of practicing the same, the following examples are presented.

EXAMPLE I

Cedanier fibers, 5.45 grams, were caused to be dispersed in 1815 ml. water in a 1 gal. stainless steel Waring Blendor. To this dispersion were added 9.4 ml. of a 2.5% aqueous solution of Marasperse and 276 grams of a water-wet cake (36.6% solids) which contained 99 grams dry wt. of polyethylene encapsulated cellulose fibers and 2 grams Hyflo. The mixture was agitated at low speed for 1.5 minutes and the thick slurry was transferred to a 4 l. beaker using a total of 548 ml. water to rinse the Blendor. While agitating the approximately 4% solids dispersion at a moderate rate with an electrically driven 4 blade 3" diameter stirrer, 29.7 ml. of a 2.5% aqueous dispersion of Nekal WS 25 (0.75% of the wt. of encapsulated fiber) were added. This was followed by the addition of 15.8 ml. of a 2.5% aqueous dispersion of Nopco DE 126 (0.4% of the wt. of encapsulated fiber). After mixing for 5 minutes, 268 ml. of a 1% aqueous solution of paper-makers' alum were added and mixing was continued for 15 minutes. The treated slurry was transferred to a 12 l. plastic drum, diluted to about 1% solids content by the addition of 7400 ml. water, and mixed with an air driven 2" diameter stirrer for 5 minutes.

Three wet 12" x 12" hand sheets were prepared on a Williams Standard Sheet Mold equipped with an 80 mesh screen, using 3 l. portions of the well mixed, diluted slurry, such that each sheet would contain approximately 30 grams of fiber solids.

The sheets were transferred to 13" x 13" Teflon coated steel plates and partially dried for 30 minutes on a hot plate whose surface temperature was regulated to 300+5° F. The sheets were allowed to stand overnight at room temperature to evaporate residual moisture in the sheets.

The sheets were then preheated for 4 minutes on the 300° F. hot plate and sintered in a 400° F. convection oven for 4 minutes. The sintered sheets were removed from the steel plates, allowed to cool, and each sheet was cut into 4 equal segments preparatory to being molded into separators. The segments were placed between a pair of preheated Teflon coated contoured dies which were in turn compressed between the heated platens of an electrically heated hydraulic Carver press, and heated to 310° F. The cooled, molded segments were finally trimmed to 5.25" x 5.84" standard separator size on a paper cutting board. The finished twelve separators had an overall thickness of 0.75".

In the following Examples II through LII, LVI and LVII hand sheets and separators of the treated fibers were prepared by repeating the procedure set forth in Example I. In Examples IV, V, XVIII, XIX, XX, XXI, XXV, XXVII, XXVIII, XXIX, XXX, LI a slight deviation from the procedure of Example I was made in that the hand sheets were prepared from an approximately 0.5 solid slurry which reduced concentration was made by diluting the 1% solids content slurries with water previously placed in the sheet mold. Similar minor deviations are specifically noted in Examples XXXVI, LVI and LVII.

EXAMPLE II

The procedure of Example I was repeated using 19.8 ml. of 2.5% Nekal WS 25 aqueous dispersion (0.5% of the wt. of the encapsulated fibers) and 9.9 ml. of 2.5% Nopco DE 126 aqueous dispersion (0.25% of the wt. of the encapsulated fibers) as the additions of the wetting agent components.

EXAMPLE III

Small sheets of Cedanier fibers, 5.45 grams, were converted to free fibers by their addition to 1815 ml. water in a 1 gal. blendor and agitating at low speed for three min. To this dispersion were added 276 grams of a water-wet cake (36.6% solids) which contained 99 grams dry wt. of polyethylene encapsulated cellulose fibers and 2 grams Hyflo. The mixture was agitated for 1.5 min. and the thick slurry was transferred to a 4 l. beaker adding 548 ml. of rinse water. While agitating the approximately 4% solids dispersion, 31.7 ml. of a 2.5% Avitone SR water dispersion (0.8% by wt. of encapsulated fiber) were added, followed by the addition of 15.9 ml. of a 2.5% Nopco DE 126 water dispersion (0.4% by wt. of encapsulated fiber). After mixing for 5 min., 317 ml. of a 1% aqueous solution of paper-makers' alum were added and mixing continued for 15 min. 9.5 ml. of a 2.5% Marasperse water solution were added and mixed in. The slurry was allowed to stand for about 24 hours after which it was transferred to a 12 l. drum, diluted with 7250 ml. water to about 1% solids content and mixed.

EXAMPLE IV

Cedanier sheets, 5.45 grams, were added to 1519 ml. water in a 1 gal. Waring Blendor which was agitated at low speed for 3 min. To the fiberized Cedanier dispersion were added 2 grams Hyflo and 185.3 grams of a water-wet cake (53.4% solids) containing 99 grams dry wt. of polyethylene encapsulated cellulose fibers. The mixture was agitated at low speed for 1.5 minutes and the thick slurry was transferred to a 4 l. beaker adding 548 ml. of rinse water. While agitating, 19.8 ml. of a 2.5% Nopco DE 126 water dispersion (0.5% of the wt. of encapsulated fibers) were added, followed, in 5 min. with the addition of 31.7 ml. of a 2.5% water solution of Nacconol NR (0.8% of the wt. of encapsulated fibers). After mixing for 5 min., 158.5 ml. of a 1% water solution of paper-makers' alum were added and, after mixing for 15 min., the slurry was allowed to stand overnight. The slurry was transferred to a 12 l. drum, diluted to about 1% solids by the addition of 7420 ml. water, and 29.4 ml. of a 1% aqueous solution of Marasperse were added with mixing for 5 min.

EXAMPLE V

The procedure of Example IV was repeated except that 19.8 ml. of a 2.5% Nopco DE 126 water dispersion (0.5% of the wt. of encapsulated fiber) and 31.7 ml. of a 2.5% Ultrawet K water dispersion (0.08% of the wt. of encapsulated fiber) were used as the additions of the cationic substance and the anionic reagent.

EXAMPLE VI

Kraft sheets, 4.6 grams, were added to 1815 ml. water containing 1.65 ml. of a 5% aqueous solution of Ceron CN in a 1 gal. blendor and blended for 3 min. to fiberize the kraft. An additional 1.65 ml. of 5% Ceron CN aqueous solution and 312.5 grams of water-wet cake (31.7% solids) containing 99 grams dry weight of polyethylene encapsulated cellulose fibers were added under low speed agitation for 1.5 min. The thick slurry was transferred to a 4 l. beaker adding 528 ml. of rinse water. While agitating, 6.9 ml. of 5% Ceron CN aqueous solution were added, followed by 22.8 ml. of a 2.5% water dispersion of Aerosol–18 (0.55% by wt. of encapsulated fiber) and then 22.8 ml. of a 2.5% water dispersion of Alkaterge C (0.55% by wt. of the encapsulated fiber). After mixing for about 5 min., 207 ml. of a 1% water solution of alum were added with mixing for 15 min. The slurry was transferred to a 12 l. drum, diluted with 7450 ml. water to about 1% solids content and mixed for 5 min.

EXAMPLE VII

A dispersion of 5.5 grams Cedanier fibers in 1815 ml. water was prepared in a 1 gal. blendor. To the slurried raw fibers were added 12.8 ml. of 2.5% Marasperse aqueous solution and 250 grams of a water wet cake (40.1% solids) which contained 100 grams dry wt. of polyethylene encapsulated cellulose fibers. The mixture was agitated at low speed for 1.5 min. and the thick slurry was transferred to a 4 l. beaker adding 548 ml. rinse water. Under agitation, 19.8 ml. of a 2.5% Aerosol–18 water dispersion (0.5% by wt. of encapsulated fibers) were added. This was followed by the addition of 9.9 ml. of a 2.5% Nopco DE 126 water dispersion (0.25% by wt. of encapsulated fibers). After mixing for 5 min., 179 ml. of a 1% alum aqueous solution were added and mixing continued for 15 min. The treated slurry was transferred to a 12 l. drum, diluted to about 1% solids content by the addition of 7400 ml. water, and mixed for 5 minutes. The pH of the slurry was raised to 6.1 and a flocculent was added.

EXAMPLE VIII

A dispersion was prepared by adding 5.45 grams of Cedanier sheeted fibers to 1485 ml. water in a blendor and agitating at low speed for 3 min. To the Cedanier fibers were added 204 grams of a water-wet cake (48.5% solids) which contained 99 grams dry wt. of polyethylene encapsulated cellulose fibers. The mixture was agitated and transferred to a 4 liter beaker adding 548 ml. rinse water. While agitating, 24.8 ml. of a 2.5% Genamid 2000 water solution (0.6% by wt. of encapsulated fibers) were added. After mixing 5 minutes, 24.8 ml. of a 2.5% Nekal WS 25 (0.6% by wt. of the encapsulated fibers) water dispersion were added and the slurry was stirred for 5 min. This was followed by the addition of 178.5 ml. of a 1% alum aqueous solution and mixing was continued for 15 minutes. After the dispersion was allowed to stand for 72 hrs., it was transferred to a 12 l. drum, diluted to about 1% solids content with 7400 ml. water and with mixing 19.8 ml. of a 1% Marasperse aqueous solution were added.

EXAMPLE IX

A dispersion was prepared by adding 5.45 grams of kraft Cedanier sheeted fibers to water in a blender and agitating at low speed for about 3 min. To the dispersion were added 204 grams of water-wet cake (48.5% solids) which contained 99 grams dry wt. of polyethylene encapsulated cellulose fibers. The mixture was agitated and transferred to a 4 l. beaker adding sufficient water to provide a dispersion having a solid content between 4–5%. While agitating the dispersion at a moderate rate, 39.6 ml. of a 2.5% Nopco DE 126 water dispersion (1.0% by wt. of encapsulated fibers) were added. 19.8 ml. of a 2.5% Nekal WS 25 water dispersion (0.5% by wt. of the encapsulated fibers) were added. This was followed by the addition of 148.5 ml. of a 1% papermakers' alum aqueous solution. After the slurry was allowed to stand between 20–30 hrs., it was transferred to a 12 l. drum, and diluted with water to about 1% solids content. 12.7 ml. of a 2.5% Marasperse water solution were added and mixed in.

EXAMPLE X

The procedure of Example IX was repeated employing the following ingredients which are listed in the order of their addition.

kraft fibers, 5.45 grams
polyethylene encased cellulose fibers (water-wet cake 204 grams), 99 grams
cationic substance—Genamid 2000, 16.3 ml. of a 2.44% water solution (0.4% by wt. of encased fibers)
anionic reagent—DDBSA, 21.7 ml. of a 4.75% water solution (1.04% by wt. of encased fibers)

EXAMPLE XI

The procedure of Example IX was repeated employing the following ingredients which are listed in the order of their addition.

kraft fibers, 5.45 grams
polyethylene encased cellulose fibers, 99 grams
cationic substance—polyethyleneimine as the partial sulfate, 19.8 ml. of a 0.5% aqueous solution (0.1% polyethyleneimine by wt. of encased fibers)
anionic reagent—Avitone SR, 49.5 ml. of a 2.5% aqueous dispersion (1.25% by wt. of encased fibers)
alum, 1% water solution, 185.6 ml.
Marasperse, 1% water solution, 29.7 ml.

EXAMPLE XII

The procedure of Example XI was repeated except that 49.5 ml. of 2.5% aqueous dispersion of Alconate (1.25% by wt. of encased fibers) was added in place of the Avitone SR.

EXAMPLE XIII

The procedure of Example XI was repeated adding as the wetting agent components, 39.6 ml. of a 0.5% aqueous solution of polyethyleneimine as the partial sulfate (0.2% polyethyleneimine by wt. of the encapsulated fibers) and 47.5 ml. of a 2.5% aqueous dispersion of the Aerosol OT (1.2% by wt. of encased fibers).

EXAMPLE XIV

The method of Example XI was repeated except that the wetting agent components added were as follows:

49.5 ml. of a 0.5% aqueous solution of polyethyleneimine as the partial sulfate (0.25% polyethyleneimine by wt. of the encapsulated fibers) and 39.6 ml. of a 2.5% aqueous dispersion of Nekal WS 25 (1.0% by wt. of encapsulated fibers).

EXAMPLE XV

The procedure of Example IX was repeated employing the following ingredients which are listed in the order of their addition.

kraft fibers, 5.45 grams
polyethylene encased cellulose fibers (water-wet cake 204 grams), 99 grams
cationic substance—Nopco DE 126, 29.7 ml. of a 2.5% water dispersion (0.75% by wt. of encased fibers).
anionic reagent—Nekal WS 25, 29.7 ml. of a 2.5% water dispersion (0.75% by wt. of encased fibers).
alum, 1% water solution, 222.5 ml.
Marasperse, 1% water solution, 29.7 ml.

EXAMPLE XVI

The procedure of Example IX was repeated employing the following ingredients which are listed in the order of their addition.

kraft fibers, 5.45 grams
polyethylene encased cellulose fibers (water-wet cake 204 grams), 99 grams.
cationic substance—Nopco DE 126, 19.8 ml. of a 2.5% water dispersion (0.5% by wt. of encased fibers)
anionic reagent—Nekal WS 25, 39.6 ml. of a 2.5% water dispersion (1% by wt. of encased fibers)
alum, 1% water solution, 297 ml.
Marasperse, 1% water solution, 29.7 ml.

EXAMPLE XVII

The procedure of Example IX was repeated employing the following ingredients which are listed in the order of their addition.

kraft fibers, 5.45 grams
polyethylene encased cellulose fibers (water-wet cake 204 grams, 99 grams
cationic substance—Nopco DE 126, 29.7 ml. of a 2.5% water dispersion (0.75% by wt. of encased fibers)
anionic reagent—Alconate, 19.85 ml. of a 2.5% water dispersion (0.5% by wt. of encased fibers)
alum, 1% water solution, 99 ml.
Marasperse, 1% water solution, 29.7 ml.

EXAMPLE XVIII

The procedure of Example IX was repeated employing the following ingredients which are listed in the order of their addition.

kraft fibers, 5.45 grams
polyethylene encased cellulose fibers (water-wet cake 194 grams), 99 grams
anionic reagent—Aerosol 18, 29.7 ml. of a 2.5% water dispersion (0.75% by wt. of encased fibers)
cationic substance—Nopco DE 126, 29.7 ml. of a 2.5% water dispersion (0.75% by wt. of encased fibers)
alum, 1% water solution, 148.5 ml.
Marasperse, 1% water solution, 29.7 ml.

EXAMPLE XIX

The procedure of Example IX was repeated employing the following ingredients which are listed in the order of their addition.

kraft fibers, 5.45 grams
Hyflo, 2 grams
polyethylene encased cellulose fibers (water-wet cake, 172 grams), 99 grams
cationic substance—Nopco 1425 C, 14.8 ml. of a 2.5% water dispersion (0.375% by wt. of encased fibers)
anionic reagent—Nekal WS 25, 39.6 ml. of a 2.5% water dispersion (1% by wt. of encased fibers)
alum, 1% water solution, 148.5 ml.
Marasperse, 1% water solution, 29.6 ml.

EXAMPLE XX

A sulfate salt of Nopco 1425 C was prepared by neutralizing a water solution of Nopco 1425 C with dilute to a pH of 4.0. The amine sulfate salt was diluted with water to give a solution containing 2.5% (wt./vol.) Nopco 1425 C based on the weight of unneutralized amine.

The procedure of Example IX was repeated employing the following ingredients which are listed in the order of their addition.

kraft fibers, 5.45 grams
Hyflo, 2 grams
polyethylene encased cellulose fibers (water-wet cake, 172 grams) 99 grams
cationic substance—Nopco 1425 C as the sulfate salt 19.8 ml. of a 2.5% water solution (0.5% by wt. of encased fibers)
anionic reagent—Nekal WS 25, 39.6 ml. of a 2.5% water dispersion (1% by wt. of encased fibers)
alum, 1% water solution, 148.5 ml.
Marasperse, 1% water solution, 29.6 ml.

EXAMPLE XXI

The procedure of Example IX was repeated employing the following ingredients which are listed in the order of their addition.

kraft fibers, 5.45 grams
Hyflo, 2 grams
polyethylene encased cellulose fibers (water-wet cake, 172 grams), 99 grams
cationic substance—Nopco 1425 C, 25.7 ml. of a 2.5% water dispersion (0.65% by wt. of encased fibers)
anionic reagent—Nekal WC 25, 39.6 ml. of a 2.5% water dispersion (1% by wt. of encased fibers)
alum, 1% water solution, 148.5 ml.
Marasperse, 1% water solution, 29.6 ml.

EXAMPLE XXII

The procedure of Example IX was repeated employing the following ingredients which are listed in the order of their addition.

kraft fibers, 5.45 grams
polyethylene encased cellulose fibers (water-wet cake, 176 grams), 99 grams
cationic substance—polyethyleneimine as the partial sulfate 40 ml. of a 0.5% water solution (0.2% by wt. of encased fibers)
anionic reagent—Nekal WS 25, 40 ml. of a 2.5% water dispersion (1% by wt. of the encased fibers)
alum, 1% water solution, 150 ml.
Marasperse, 1% water solution, 30 ml.

EXAMPLE XXIII

The procedure of Example IX was repeated employing the following ingredients which are listed in the order of their addition.

kraft fibers, 5.45 grams
Hyflo, 2 grams
polyethylene encased cellulose fibers (water-wet cake, 188.5 grams), 99 grams
cationic substance—Nopco DE 126, 19.8 ml. of a 2.5% water dispersion (0.5% by wt. of encased fibers)
anionic reagent—Nekal BX 78, 39.6 ml. of a 2.5% water dispersion (1% by wt. of encased fibers)
alum, 1% water solution, 148.5 ml.
Marasperse, 1% water solution, 29.6 ml.

EXAMPLE XXIV

The procedure of Example IX was repeated employing the following ingredients which are listed in the order of their addition.

kraft fibers, 5 grams
Hyflo, 2 grams
polyethylene encased cellulose fibers (water-wet cake, 188.5 grams), 99 grams
cationic substance—Nopco DE 126, 19.8 ml. of a 2.5% water dispersion (0.5% by wt. of encased fibers)

anionic reagent—Sipex TDS, 39.6 ml. of a 2.5% water dispersion (1% by wt. of encased fibers)
alum, 1% water solution, 148.5 ml.
Marasperse, 1% water solution, 29.6 ml.

EXAMPLE XXV

The procedure of Example IX was repeated employing the following ingredients which are listed in the order of their addition.

kraft fibers, 5.45 grams
Hyflo, 2 grams
polyethylene encased cellulose fibers (water-wet cake, 188.5 grams), 99 grams
cationic substance—polyethyleneimine as the partial sulfate 39.6 ml. of a 0.5% water solution (0.2% by wt. of encased fibers)
anionic reagent—Nacconal NR, 47.5 ml. of a 2.5% water solution (1.2% by wt. of encased fibers)
alum, 1% water solution, 178.5 ml.
Marasperse, 1% water solution, 29.6 ml.

EXAMPLE XXVI

The procedure of Example IX was repeated employing the following ingredients which are listed in the order of their addition.

kraft fibers, 5.45 grams
Hyflo, 2 grams
polyethylene encased cellulose fibers (water-wet cake, 188.5 grams), 99 grams
cationic substance—Nopco DE 126, 19.8 ml. of a 2.5% water dispersion (0.5% by wt. of encased fibers)
anionic reagent—Phi-O-Sol WA, 39.6 ml. of a 2.5% water solution (1% by wt. of encased fibers)
alum, 1% water solution, 198 ml.
Marasperse, 1% water solution, 29.7 ml.

EXAMPLE XXVII

The procedure of Example IX was repeated employing the following ingredients which are listed in the order of their addition.

kraft fibers, 5.45 grams
polyethylene encased cellulose fibers (water-wet cake 185.3 grams), 99 grams
cationic substance—polyethyleneimine as the partial sulfate 8.25 ml. of a 3% water solution (0.25% by wt. of encased fibers)
anionic reagent—Nekal WS 25, 39.6 ml. of a 2.5% water dispersion (1% by wt. of encased fibers)
alum, 1% water solution, 148.5 ml.
Marasperse, 1% water solution, 29.7 ml.

EXAMPLE XXVIII

The procedure of Example IX was repeated employing the following ingredients which are listed in the order of their addition.

kraft fibers, 5.08 grams
Hyflo, 1.85 grams
polyethylene encased cellulose fibers (water-wet cake 171.7 grams), 92.5 grams
cationic substance—Nopco DE 126, 14.8 ml. of a 2.5% water dispersion (0.4% by wt. of encased fibers)
anionic reagent—Nekal WS 25, 22.2 ml. of a 2.5% water dispersion (0.6% by wt. of encased fibers)
alum, 1% water solution, 110.9 ml.
Marasperse, 1% water solution, 27.7 ml.

EXAMPLE XXIX

The procedure of Example XXVIII was repeated except that no kraft fibers were used.

EXAMPLE XXX

The procedure of Example XXVIII was repeated except that no alum was used.

EXAMPLE XXXI

With agitation, 141 grams of a toluene-wet cake containing 100 grams dry weight of polyethylene encased cellulose fibers were added to 1600 ml. water in a 3-necked 3 l. flask equipped with a stirrer, thermometer, condenser, and connections to a source of steam. A solution of 2.5 grams of Versamid 115 in 16.5 ml. of toluene was added and thoroughly mixed with the fibers. All the toluene was removed by steam distillation, thereby depositing the Versamid on the encapsulated fibers. The cooled slurry was then adjusted to a volume of about 1500 ml. by the addition of water.

A dispersion was prepared by adding 5.5 grams of Cedanier kraft fibers to water in a one gal. Waring Blendor and agitating at low speed for 3 min. The Versamid 115—treated fiber slurry was added, together with 12.8 ml. of a 2.5% aqueous solution of Marasperse and the mixture was blended for 1.5 min. at low speed. The slurry was transferred to a 4 l. beaker with additional water to provide a slurry having a solids content of about 4–6%. While agitating the dispersion at a moderate rate, 17.2 ml. of a 2.5% aqueous solution of Aerosol OT (0.43% of the wt. of encapsulated fiber) were added. After the slurry had been stirred, 151 ml. of a 1% aqueous solution of paper-makers' alum were added and stirring was continued. Subsequently, the treated slurry was transferred to a 12 l. drum, diluted with water to about 1% solids content and mixed.

EXAMPLE XXXII

With agitation, 200 grams of a toluene-wet cake (70.2% solids) containing 140.5 grams dry weight of polyethylene encapsulated cellulose fiber were added to 1 liter of water in a 3-necked 3 l. flask equipped with a stirrer, thermometer, condenser and a connection to a source of steam. A solution of 1.5 grams Versamid 115 in about 10 ml. of toluene was added and thoroughly mixed with the fibers. All the toluene was removed by steam distillation thereby depositing the Versamid on the encapsulated fibers. About 600 ml. extra water were added during distillation. The cooled slurry was then adjusted to a volume of about 1800 ml. by the addition of water.

Repeating the procedure detailed in Example XXXI the Versamid 115 treated encapsulated fibers were subjected to the following additives, listed in order of their addition.

kraft fibers, 5.5 grams
Marasperse, 2.5% water solution, 12.8 ml.
anionic reagent—Aerosol OT, 17.2 ml. of a 2.5% water dispersion (0.306% by wt. of encapsulated fibers)
alum, 1% solution, 151 ml.

EXAMPLE XXXIII

The procedure of Example XXXI was repeated, employing the following ingredients listed in order of their addition.

kraft fibers, 5.45 grams
cationic substance—treated water-wet cake (235.3 grams) containing 99 grams polyethylene encased cellulose fibers and 2.02 grams of Versamid 115 (2.05% by wt. of encased fibers)
anionic reagent—Aerosol OT, 24.8 ml. of a 2.5% aqueous dispersion (0.6% by wt. of encased fibers)
alum, 1% water solution, 208 ml.

EXAMPLE XXXIV

The procedure of Example XXXIII was repeated except that 39.6 ml. of 2.5% aqueous solution of Sulframin 1288 (1% by wt. of the encapsulated fibers) was substituted for the Aerosol OT addition.

EXAMPLE XXXV

The procedure of Example XXXIII was repeated except that 39.6 ml. of a 2.5% aqueous solution of DDBSA (1% by wt. of encapsulated fibers) was substituted for the Aerosol OT addition.

EXAMPLE XXXVI

To a dispersion of 5.5 grams of raw kraft fibers in 965 ml. water were added 198 grams of a Versamid 115 treated, water-wet cake (50.6% solids) containing 98.5 grams of polyethylene encapsulated cellulose fibers and 1.5 grams of Versamid 115 (1.52% of the weight of encapsulated fiber). This cake had been prepared by the method described in Example XXXI. The mixture was blended for 1.5 minutes and tranferred to a 4 l. beaker adding 1500 ml. water. While agitating, 16 ml. of a 2.5% water dispersion of Nekal WS 25 (0.41% of the wt. of encapsulated fibers) were added. After stirring for 5 min., 151 ml. of a 1% water solution of alum was added and stirring was continued for 15 min. The treated slurry was allowed to stand 19 hours. About 860 grams of the well mixed slurry (approximately 30% of the total weight) was removed and put in a paper mold containing 4400 ml. water. The diluted solids were well mixed and a wet sheet was prepared from this approximately 0.6% slurry. Two additional wet sheets were prepared in a similar manner. The sheets were dried, sintered, and molded as described in Example I.

EXAMPLE XXXVII

The procedure of Example XXXI was repeated, except as noted below, employing the following ingredients listed in order of their additions.

kraft fibers, 5.45 grams
cationic substance—treated water-wet cake (1825 grams) containing 99 grams polyethylene encased cellulose fibers and 0.99 gram of Genamid 250
anionic reagent—DDBSA, 19.8 ml. of a 2.5 aqueous solution (0.5% by wt. of encased fibers)
alum, 1% aqueous solution, 198 ml.
Marasperse, 1% aqueous solution, 29.7 ml. treated slurry was first heated to 160–170° F. before being diluted with hot water to about 1% solids content

EXAMPLE XXXVIII

The procedure of Example XXXI was repeated employing the following ingredients listed in order of their addition.

kraft fibers, 5.45 grams
cationic substance treated water-wet cake (216 grams) containing 99 grams of polyethylene encased cellulose fibers and 1.49 grams of Versamid 115
anionic reagent—Nekal WS 25, 27.7 ml. of a 2.5% water dispersion (0.7% by wt. of encased fibers)

EXAMPLE XXXIX

The procedure of Example XXXI was repeated employing the following ingredients listed in order of their addition.

kraft fibers, 5.45 grams
cationic substance treated wet-cake (353.3 grams) containing 99 grams of polyethylene cellulose fibers and 0.99 gram of Genamid 250
anionic reagent—Nekal WS 25, 15.9 ml. of a 2.5% aqueous dispersion (0.4% by wt. of encapsulated fibers)
alum, 1% water solution, 119. ml.

EXAMPLE XL

The procedure of Example XXXI was repeated employing the following ingredients listed in order of their addition.

kraft fibers, 5.45 grams
cationic substance treated wet-cake (285 grams) containing 99 grams polyethylene encased cellulose fibers and 0.99 gram of Genamid 250
anionic reagent—DDBSA, 31.2 ml. of a 4.75% aqueous solution (1.5% by wt. of encased fibers)

EXAMPLE XLI

The procedure of Example XXXI was repeated, except as noted below, using the following ingredients listed in order of their addition.

kraft fibers, 5.45 grams
cationic substance treated wet-cake (222 grams) containing 99 grams of polyethylene encased cellulose fibers and 1.96 grams of Versamid 115
anionic reagent—Alconate, 47.6 ml. of a 2.5% aqueous dispersion (1.2% by wt. of encased fibers)
alum, 1% solution, 247.5 ml.
Marasperse, 1% aqueous solution, 19.8 ml. treated slurry heated to 160–170° F. before being diluted with hot water to 1% solids content

EXAMPLE XLII

The procedure of Example XXXI was repeated, except as noted below, using the following ingredients listed in order of their addition.

kraft fibers, 5.45 grams
cationic substance treated water-wet cake (259 grams) containing 99 grams of polyethylene encased cellulose fibers and 0.99 gram Genamid 250
anionic reagent—Alconate, 19.8 ml. of a 2.5% water dispersion (0.5% by wt. of encased fibers)
alum, 1% water solution, 148.5 ml.
Tamol N, 1% water solution, 29.7 ml. treated slurry heated to 160–170° F. before being diluted with hot water to about 1% solids content

EXAMPLE XLIII

The procedure of Example XXXI was repeated using the following ingredients listed in order of their addition.

kraft fibers, 5.5 grams
cationic substance treated water-wet cake of 100 grams polyethylene encased cellulose fibers and 0.5 gram of Armeen M2HT
anionic reagent—Nekal WS 25, 32 ml. of a 2.5% aqueous dispersion (0.8% by wt. of encased fibers)
alum, 1% water solution, 120 ml.
Marasperse, 1% water solution, 30 ml.

EXAMPLE XLIV

The procedure of Example XLIII was repeated except that 32 ml. of a 2.5% aqueous dispersion of Alconate (0.8% by wt. of encased fibers) were added in place of Nekal WS 25 addition.

EXAMPLE XLV

The procedure of Example XXXI was repeated employing the following ingredients listed in order of their addition.

kraft fibers, 5.45 grams
cationic substance treated water-wet cake (324 grams) containing 99 grams of polyethylene encased cellulose fibers and 0.49 gram of Versamid 125
anionic reagent—Alconate, 39.6 ml. of a 2.5% aqueous dispersion (1% by wt. of encased fibers)
alum, 1% aqueous solution, 198 ml.
Tamol N, 1% aqueous solution, 29.7 ml.

EXAMPLE XLVI

The procedure of Example XLV was repeated except that 0.495 grams of Versamid 140 were substituted for the Versamid 125.

EXAMPLE XLVII

The procedure of Example XXXI was repeated employing the following ingredients listed in order of their addition.

kraft fibers, 5.45 grams cationic substance treated water-wet cake (297 grams) containing 99 grams of polyethylene encased cellulose fibers and 0.37 gram of Versamid 115
anionic reagent—Nekal WS 25, 39.6 ml. of a 2.5% aqueous dispersion (1% by wt. of encased fibers)
alum, 1% aqueous solution, 198 ml.

EXAMPLE XLVIII

The procedure of Example XLVII was repeated except that 49.5 ml. of a 2.5% Alconate aqueous dispersion (1.25% by wt. of encapsulated fibers) was substituted for the Nekal WS 25 and that the alum addition was increased by adding 247.5 ml. of a 1% aqueous solution.

EXAMPLE XLIX

The procedure of Example XXXI was repeated employing the following ingredients listed in order of their addition.
kraft fibers, 5.45 grams
cationic substance treated water-wet cake (451 grams) containing 99 grams polyethylene encased cellulose fibers and 0.68 gram of Armeen M2HT
anionic reagent—Aerosol OT, 27.7 ml. of a 2.5% aqueous solution (0.7% by wt. of encased fibers)
alum, 1% aqueous solution, 104 ml.

EXAMPLE L

To a water dispersion of 1.4 grams kraft fibers and 0.5 ml. of an aqueous solution of 5% Ceron CN were added with agitation an additional 0.5 ml. of the Ceron CN and 79.7 grams of water-wet cake (37.6% solids) which contained 30 grams dry wt. of polyethylene encapsulated cellulose fibers. The slurry was transferred to a 2 l. beaker adding 160 ml. water and while agitating, 2.1 ml. of additional Ceron CN were added followed by 6.9 ml. of a 2.5% aqueous dispersion of Aerosol 18 (0.575% by wt. of encapsulated fibers). After mixing for 5 min., 77.7 ml. of a 1% aqueous solution of alum were added and the slurry was mixed for 15 min. The slurry was diluted with water to about a 1% solids content.

The sintered sheets were not wetted by water or by 1.28 specific gravity sulfuric acid.

EXAMPLE LI

The procedure of Example XXXI was repeated employing the following ingredients listed in order of their addition.
kraft fibers, 5.5 grams
cationic substance treated water-wet cake (1557 grams) containing 99 grams of polyethylene encapsulated cellulose fibers and 1.49 grams Genamid 250

EXAMPLE LII

The procedure of Example XXXIII was repeated without adding the anionic Aersol OT reagent and the alum.

EXAMPLE LIII 1435 lbs. of deflocculated cellulose fibers in 4600 gal. of toluene were azeotroped to reduce the water content of the fibers to about 0.1%. The mixture was maintained under a nitrogen atmosphere, cooled to about 135° F., and with continuous agitation 36.1 lbs. of titanium tetrachloride were added. This was followed by the addition of 30.5 lbs. of triethyl aluminum. Ethylene gas was then passed into the mixture until the polyethylene, formed as individual shells on each of the fibers, equaled about 52.5% of the total weight of the cellulose and polymer. The polymerization period took between 4–5 hours during which time the temperature was kept between 145–165° F. The batch was cooled, diluted with toluene and the catalyst was arrested by the addition of ammonia. The slurry was centrifuged to provide a wet-cake of about 45% solids content and placed in 2700 gal. of hot water. Steam was passed through the agitated slurry and the toluene was distilled off. The polymer encased fibers were then prepared for separator sheet formation on a paper-making machine as follows:

Sufficient water was added to provide a slurry of about 7% solids content and Marasperse in an amount equal to 0.05 to 0.1% of the dry wt. of the polymer encased cellulose fibers, was added. The fibers were well dispersed and with mixing there were subsequently added aqueous dispersions containing, in total, 185 lbs. of raw kraft fibers, 11.4 lbs. (0.4% by wt. of encapsulated fibers) of a cationic substance—Nopco DE 126, 58 lbs. of Hyflo and 19.2 lbs. (0.675% by wt. of encapsulated fibers) of an anionic reagent—Nekal WS 25. 48 lbs. of papermaker's alum dissolved in 300–500 gal. of white water were blended into the slurry and the slurry was allowed to stand for about 8 hours at a temperature of about 120 to 140° F. The warm slurry was then diluted with warm white water to 0.5 to 0.8% solids content and an aqueous solution of Marasperse was added in an amount of 0.25 to 0.3% by wt. of encapsulated fibers.

The dispersion was well mixed and continuously deposited on a paper-making machine and a wet web of fibers was formed. The wet web was then conveyed through an oven wherein it was dried and sintered into a cohesive sheet. The hot, sintered sheet was passed between two heated embossing rolls and rib and back web patterns were impressed on the sheet. The sheet was air cooled and cut into battery separators.

EXAMPLE LIV

Polyethylene encapsulated cellulose fibers were prepared following the procedure of Example LIII.

Following the removal of all the toluene from the water slurry by steam distillation sufficient water was added to provide a slurry of about 0.63% solids content. Approximately 1675 gal. of the diluted slurry, which contained 88 lbs. of polyethylene encapsulated fibers, were agitated until clumps of fibers had been broken up. About 175 gal. of the cooled slurry were put in a high speed mixer together with 1.75 lbs. of Hyflo and 4.87 lbs. of raw Cedanier fibrous sheets. The mixture was first agitated to fiberize the Cedanier sheets and then returned, with thorough mixing, to the bulk of the slurry. With moderate agitation and at about five minute intervals there were added aqueous solutions containing 0.28 lbs. of Marasperse, 0.44 lbs. of Nekal WS 25 (0.5% by wt. of encapsulated fibers) and 1.63 lbs. of paper-makers' alum.

In a continuous operation, the slurry of fibers were formed into a wet felt on a paper-making machine. The felt was dried and sintered in an oven and embossed with ribs between two contoured hot rolls. The sheeted product was cut into battery separators.

EXAMPLE LV

Polyethylene encapsulated cellulose fibers were prepared following the procedure of Example LIII. The starting dry weight of the cellulose fibers and the amount of polymer formed on the fibers were such that the total weight of the encapsulated fibers was 2500 lbs.

Following the removal of all the toluene from the water slurry by steam distillation, sufficient water was added to provide a slurry of about 7% solids content. An aqueous solution containing 2 lbs. Marasperse and 50 lbs. Hyflo was added and the slurry was diluted with white water to reduce the solids content to about 5.5%. The slurry was agitated to break up any aggregated fibers and with continuous agitation there were added aqueous dispersions containing, in total, 137.5 lbs. uncoated kraft fibers, 11.6 lbs. Aerosol OT (0.465% by wt. of encapsulated fibers) and 38 lbs. alum. After reducing the percent solids to about 4 by the addition of white water, the slurry was allowed to stand for about 8 hours.

After further dilution of the slurry, it was fed in a continuous operation onto a paper-making machine where a wet web of fibers was formed. The web was dried and sintered in an oven and embossed with ribs between two heated contoured rolls. The sheeted product was cut into battery separators.

EXAMPLE LVI 276 grams of a water-wet cake containing 99 grams dry wt. of polyethylene encapsulated fibers and 2 grams of Hyflo were blended into a water dispersion of 5.45 grams raw kraft fibers. The slurry was diluted to about 5.5% solids content and 31.7 ml. of a 2.5% Avitone SR aqueous dispersion (0.8% by weight of encapsulated fibers were added). This was followed by the addition of 317 ml. of a 1% aqueous solution of alum and 9.5 ml. of a 2.5% aqueous solution of Marasperse. After standing about 23 hours the slurry was warmed to 65° C. and 3 hand sheets were prepared from about 750 grams of the slurry which was diluted in the sheet mold to about 0.65% solids with 4320 ml. of a prepared warm white water solution which contained minute amounts of Avitone SR, alum, and Marasperse.

EXAMPLE LVII

To a dispersion of 5.08 grams uncoated kraft fibers in water were added 171.7 grams of a wet cake containing 92.5 grams polyethylene encapsulated cellulose fibers. The mixture was agitated at low speed for 1.5 minutes to give a slurry of dispersed fibers of about 6.25% solids content. In a separate container 14.8 ml. of a 2.5% aqueous dispersion of Nopco DE–126 (0.4% of the weight of encapsulated fiber) were added with agitation to 6930 ml. water followed, in 5–10 minutes, by the addition of 22.2 ml. of a 2.5% aqueous dispersion of Nekal WS–25 (0.6% of the weight of encapsulated fiber). Although the total concentration was only 0.014%, reaction between the two components produced an easily discernible turbidity. At the same concentration, Nekal WS–25 alone exhibits a perfectly clear solution and Nopco DE–126 alone shows a mere trace of turbidity. The above prepared fiber dispersion was added to the Nopco-Nekal dispersion with mixing for 15 minutes. To this were added 110.5 ml. of an aqueous 1% alum solution and, 5 min. thereafter, 27.7 ml. of an aqueous 1% solution of Marasperse. Three wet hand sheets of about 30 grams (dry weight) were made on the 12" x 12" Williams mold by mixing 2800 ml. of the slurry with 2800 ml. of water previously placed in the mold. The wet sheets were dried, sintered, and molded into separators according to the procedure set forth in Example I.

EXAMPLE LVIII

Two different types of commercially available phenol-formaldehyde resin impregnated paper separators (designated type A and B) and a prepared polyethylene separator (designated type C) were subjected to a cationic-anionic wetting agent dipping treatment according to the following procedure:

Twenty-nine separators of each type were soaked in 2.5–3.0 liters of 1.265 specific gravity sulfuric acid for 67 hours at room temperature. They were then washed in running cold water for about 24 hours, briefly drained to remove excess water, blotted lightly and dried in a flow of air heated to a temperature of 75–80° F. Ten of each type of these acid treated separators, together with 12 separators of type C were then dipped into an aqueous dispersion of Nopco DE–126 until completely saturated. Separators A and C were dipped under reduced pressures to facilitate replacement of entrapped air in the separators with the dispersion. After the separators were drained free of excess liquid and dried they were dipped into an aqueous dispersion of Nekal WS–25. After their complete saturation, the separators were drained free of excess liquid, blotted lightly and dried in a 75–80° F. air current.

Based on prior tests which measured the amount of water which each type of separator retainer upon saturation, the strength of the dipping dispersions containing the wetting agent components were adjusted so that, by wt., 0.17–0.19% Nopco DE–126 and 0.40–0.42% Nekal WS–25 would be deposited on each type of separator.

In the foregoing examples wherein separator forming fibers or fully processed separators were treated with both a cationic substance and an anionic reagent, the resulting reaction product of the wetting agent components formed on and about the fibers. Analysis of a representative reaction product shows it to be a viscous, poorly ionizable, substantially water insoluble precipitated salt which tenaciously adheres to the fibers.

The separators made and treated according to Examples I through LVIII were subjected to resistance measurements, dry charge tests, and rewettability tests. The results of these tests are given in Tables A, B, and C.

The electrical resistance determinations, were made following a standard Association of American Battery Manufacturers procedure using separators having an area of 21.2 sq. in. and soaking conditions of 80° F. for 20 minutes.

After determining initial resistance, the separators were soaked in 1.280 specific gravity sulfuric acid at room temperatures for 18–20 hours. They were then washed free of acid, dried at 105° C. and underwent a second 80° F., 20 minute resistance measurement. A lower, equal or slightly higher second resistance indicates a retained wetting agent on the tested separators which is relatively stable to sulfuric acid and has a low water solubility.

The dry charge test comprised cell assembly using 9-plate cells of conventional components and eight of the twelve separators made according to the examples, forming, washing, drying, activating and discharging. The cells were charged by conventional methods using either of two rates; 45 amps for 4.5 hours or 7 amps for 24 hours. After the formed and charged cells were thoroughly washed free of acid, they were dried at a temperature between 185–300° F. for a period varying between 45 minutes and 2 hours. Based on a S.A.E. standard method, the cooled and dried cells were inserted into a battery case and sufficient 1.265 specific gravity sulfuric acid at 80° F. was added to cover the plates. The cells were discharged at 150 amps to a terminal voltage of 1 volt. The voltage of each cell was recorded 5 seconds from start of discharge (5 sec. voltage) and the time was noted for the voltage to drop from initial voltage to the 1 volt terminal voltage (capacity). Minimum industry requirements for these tests are, approximately, 3.5 minutes for the capacity test and 1.5 volts for the 5 sec. voltage test.

After the separators, used as components in a battery cell, had gone through a forming operation, washed free of acid electrolyte and dried, and through a dry charge test procedure, they were tested visually for their rewettability performance. This test was based on the observation that unwetted or partially wetted internal or external surfaces of a separator exhibited lighter color densities that completely wetted surfaces and entailed inspecting separators under reflected light and estimating the wettability or rewettability. Thus, for example, when testing a separator having a total area of about 25 square inches, each ¼ inch square area or fraction thereof exhibiting the characteristic lighter color density was deemed to represent 1% unwettability (99% rewettability).

The percentages reported in the tables represent the average rewettability of the 8 (one cell) tested separators.

TABLE A.—SEPARATORS CONTAINING CATIONIC ANIONIC COMPLEX WETTING AGENT

| Separators, Example No. | Resistance (ohm-in.²) | | 5 sec. (volt) | Capacity (min.) | Av. percent rewet. |
|---|---|---|---|---|---|
| | 1st | 2nd | | | |
| XXXII | 0.104 | 0.195 | 1.68 | 5.85 | 100 |
| XXXI | 0.051 | 0.068 | 1.72 | 4.92 | 96 |
| XXXIII | 0.042 | 0.057 | 1.74 | 4.33 | 98-9 |
| XLIX | 0.083 | 0.083 | | | 99-100 |
| XIII | 0.055 | 0.059 | | | 100 |
| XLII | 0.057 | 0.060 | 1.74 | 5.00 | 100 |

TABLE A.—Continued

| Separators, Example No. | Resistance (ohm-in.²) 1st | Resistance (ohm-in.²) 2nd | 5 sec. (volt) | Capacity (min.) | Av. percent rewet. |
|---|---|---|---|---|---|
| XLIV | 0.040 | 0.051 | | | 98-9 |
| XLV | 0.047 | 0.051 | | | 99-100 |
| XLVI | 0.047 | 9.051 | | | 100 |
| XLI | 0.051 | 0.047 | | | 99-100 |
| XLVIII | 0.054 | 0.059 | | | 99-100 |
| XII | | | | | 100 |
| XXXVII | 0.047 | 0.051 | 1.72 | 4.43 | 99-100 |
| XL | 9.036 | 0.036 | 1.70 | 6.02 | 100 |
| X | 0.059 | 0.953 | 1.71 | 5.24 | 97 |
| XXXV | 0.049 | 0.045 | 1.68 | 6.58 | 99-100 |
| VI | 0.025 | 0.034 | 1.59 | 5.09 | |
| XXV | 0.047 | 0.042 | | | 98-9 |
| XI | | | | | 95-6 |
| XXXIV | 0.045 | 0.045 | 1.68 | 6.45 | 99-100 |
| II | 0.042 | 0.047 | 1.76 | 6.15 | 98 |
| XXVIII | 0.038 | 0.036 | 1.80 | 7.08 | 100 |
| XXIX | 0.028 | 0.028 | 1.80 | 7.00 | 100 (−) |
| XXX | 0.038 | 0.040 | 1.80 | 7.08 | 100 |
| LIII | 0.041 | | 1.80 | 7.03 | 99-100 |
| I | 0.042 | 0.038 | 1.77 | 6.03 | 100 |
| XVI | 0.038 | 0.048 | | | 100 |
| XV | 0.053 | 0.046 | | | 100 |
| IX | 0.034 | 0.045 | 1.70 | 4.32 | 100 |
| VII | 0.036 | 0.10 | 1.77 | 5.53 | 95 |
| XVIII | 0.061 | 0.055 | | | 99-100 |
| IV | 0.045 | 0.051 | | | 99-100 |
| V | 0.036 | 0.038 | | | 99-100 |
| XXIII | 0.049 | 0.051 | | | 99-100 |
| XXIV | 0.053 | 0.055 | | | 99-100 |
| XXVI | 0.047 | 0.053 | | | 93 |
| XVII | 0.051 | 0.045 | | | 100 |
| XIX | 0.042 | 0.042 | | | 98-9 |
| XXI | 0.042 | 0.047 | | | 99 |
| XX | 0.038 | 0.040 | | | 100 |
| XXII | 0.040 | 0.042 | | | 99 |
| XXVII | 0.049 | 0.053 | | | 98-9 |
| XIV | 0.045 | 0.047 | | | 99-100 |
| VIII | 0.061 | 0.057 | 1.72 | 5.61 | 98-9 |
| XXXVI | 0.042 | 0.042 | 1.73 | 6.05 | 99 |
| XXXVIII | 0.051 | 0.042 | 1.70 | 5.25 | 100 |
| XLVII | 0.042 | 0.045 | | | 100 |
| XXXIX | 0.049 | 0.042 | 1.70 | 5.75 | 100 |
| XLIII | 0.040 | 0.051 | | | 99-100 |
| III | 0.040 | 0.049 | 1.76 | 6.20 | 99 |
| LVII | 0.036 | 0.036 | 1.77 | 7.40 | 100 |

TABLE B.—SEPARATORS TREATED WITH EITHER CATIONIC SUBSTANCE OR ANIONIC REAGENT

| Separators, Example No. | Resistance (ohm-in.²) 1st | Resistance (ohm-in.²) 2nd | 5 sec. (volt) | Capacity (min.) | Av. percent rewet. |
|---|---|---|---|---|---|
| L | Not wetted by water or 1.28 sulfuric acid | | | | |
| LI | 0.034 | 0.036 | 1.5 | 1.80 | 53 |
| LII | 0.055 | 3.89 | <1.0 | Zero | 26 |
| LIV | 0.042 | 3.76 | <1.0 | Zero | Zero |
| LV | 0.034 | 5.26 | <1.0 | Zero | |
| LVI | 0.042 | 0.91 | <1.0 | Zero | Zero |

TABLE C.—DIPPED SEPARATORS CONTAINING CATIONIC-ANIONIC COMPLEX WETTING AGENT

| Separators, Example LVIII | 5 sec. (volt) | Capacity (min.) | Average percent rewet. |
|---|---|---|---|
| (A) After acid treatment | 1.68 | 4.07 | 66 |
| (A) After dipping | 1.78 | 7.32 | 100 |
| (B) After acid treatment | 1.77 | 6.50 | 89 |
| (B) After dipping | 1.80 | 6.80 | 100 |
| (C) As made | <1.0 | 0 | Zero |
| (C) After dipping | 1.75 | 6.80 | 90 |

The results illustrated in Table A and Table C, in contrast to the results set forth in Table B and obtained with separators treated with only a cationic or an anionic component, demonstrate that separators containing the complex anionic-cationic wetting agent of the present invention are not adversely affected with respect to electrical resistance and maintenance of high battery capacities and that the wetting agent complex treated separators exhibit excellent electrolyte wettability and rewettabiliy.

The complex anionic-cationic wetting agents under testing also demonstrated that they met all the requisite properties and characteristics previously detailed and specifically showed their stability to processing and battery operational temperatures, stability in water and battery electrolyte and facility to provide rapid and continuous wettability to separators.

Various modifications can be made in the present invention without departing from the spirit and scope thereof and it should be understood that the invention is limited only as defined in the claims as read in light of the specification.

We claim:

1. A liquid permeable storage battery separator containing intimately associated therewith an organic anionic-cationic complex wetting agent, said wetting agent being electrolyte wettable and substantially insoluble in water and battery electrolyte.

2. A liquid permeable storage battery separator containing intimately associated therewith an organic anionic-cationic complex wetting agent, said wetting agent being electrolyte wettable and substantially insoluble in water and battery electrolyte wherein the anionic contributing portion of said wetting agent is selected from the group consisting of
   (a) long chain hydrocarbon sulfonate,
   (b) dodecylbenzene sulfonic acid,
   (c) sodium dodecylbenzene sulfonate,
   (d) sodium dibutylnaphthalene sulfonate,
   (e) sodium dialkyl sulfosuccinate,
   (f) disodium-N-octadecyl sulfosuccinamate,
   (g) sodium salt of sulfated butyl oleate, and
   (h) sodium tridecyl sulfate;
and the cationic contributing portion of said wetting agent is selected from the group consisting of
   (i) alkylolamine-fatty acid condensate,
   (j) N (poly) ethoxylated fatty amine,
   (k) ethoxylated quaternary alkylaryl fatty amine hydrohalide,
   (l) polyamides containing reactive amino groups,
   (m) partial sulfate salts of polyethyleneimines,
   (n) methyl di-hydrogenated tallow tert-amine, and
   (o) stearamide propyl di-methyl b-hydroxyethyl ammonium nitrate.

3. A separator according to claim 2 wherein said anionic contributing portion is a sodium dialkyl sulfosuccinate.

4. A separator according to claim 2 wherein said anionic contributing portion is disodium-N-octadecyl sulfosuccinamate.

5. A separator according to claim 2 wherein said anionic contributing portion is sodium di(2,6 dimethyl 4 heptyl) sulfosuccinate.

6. A separator according to claim 2 wherein said cationic contributing portion is an ethoxylated quaternary alkylaryl fatty amine hydrohalide.

7. A separator according to claim 2 wherein said cationic contributing portion is a partial sulfate salt of polyethyleneimine.

8. A separator according to claim 2 wherein said cationic contributing portion is a polyamide containing reactive amino groups.

9. A separator for separating the plates of a storage battery, said separator comprising a porous body of interfelted fibers, each of said fibers comprising a discrete particle of cellulosic material substantially encased in a shell of a polymer, said fibers being interlaced into a porous web of randomly oriented, intersecting fibers, said polymer shells of said fibers being fused at their points of contact in said web interconnecting said fibers at said points of contact and forming interconnected, tortuous paths through said body intermediate said fused points of contact, said separator having an organic anionic-cationic complex wetting agent uniformly distributed as a coating on said polymer shells of said fibers, said wetting agent being substantially insoluble in water and battery electrolyte and imparting to said separator continuing electrolyte wettability.

10. A separator according to claim 9 wherein the anionic contributing portion of the wetting agent is a sodium dialkyl sulfosuccinate and the cationic contributing portion of the wetting agent is an ethoxylated quaternary alkylaryl fatty amine hydrohalide.

11. A process for forming a porous, fibrous battery separator from particles of cellulosic material, said particles of cellulosic material consisting essentially of a major proportion of particles of cellulosic material each particle of which is substantially encased in a shell of a polymer and a minor proportion of uncoated cellulosic particles, the steps comprising agitating said particles encased in a shell of polymer in a fluid medium with said uncoated cellulosic particles to disperse said encased and uncoated particles substantially individually in said medium and to distribute said uncoated cellulosic particles and said encased particles substantially uniformly throughout said dispersion, treating said encased and uncoated particles in the presence of water with an organic cationic substance and an organic anionic reagent dispersed in said fluid medium and forming in situ an organic cationic-anionic complex wetting agent affixed on and about said encased and uncoated particles, forming said individually dispersed particles randomly into a porous, interlaced web of intersecting fibers and, thereafter, heating said formed web to the softening temperature of the polymer to soften and fuse the polymer shells on said particles together at the points where said fibers intersect and form a self-sustaining separator of substantially continuous electrolyte wettability.

12. A process according to claim 11 wherein said polymer is polyethylene, said cationic substance is an ethoxylated quaternary alkylaryl fatty amine hydrohalide, and said anionic reagent is a sodium dialkyl sulfosuccinate.

13. In the art of making a liquid permeable battery separator, the improvement comprising the steps of dispersing an organic cationic substance and an organic anionic reagent in a liquid medium and treating said separator with the dispersion in the presence of water and forming in situ an organic anionic-cationic complex wetting agent affixed to said separator, said wetting agent being substantially insoluble in water and battery electrolyte and imparting to said separator substantially continuous electrolyte wettability.

14. A method according to claim 13, wherein the anionic reagent is selected from the group consisting of
    (a) long chain hydrocarbon sulfonate,
    (b) dodecylbenzene sulfonic acid,
    (c) sodium dodecylbenzene sulfonate,
    (d) sodium dibutylnaphthalene sulfonate,
    (e) sodium dialkyl sulfosuccinate,
    (f) disodium-N-octadecyl sulfosuccinamate,
    (g) sodium salt of sulfated butyl oleate, and
    (h) sodium tridecyl sulfate;
and the cationic substance is selected from the group consisting of
    (i) alkylolamine-fatty acid amine,
    (j) N (poly) ethoxylated fatty amine,
    (k) ethoxylated quaternary alkylaryl fatty amine hydrohalide,
    (l) polyamides containing reactive amino groups,
    (m) partial sulfate salts of polyethyleneimines,
    (n) methyl di-hydrogenated tallow tert-amine, and
    (o) stearamide propyl di-methyl b-hydroxyethyl ammonium nitrate.

15. In a method for making dry charged storage batteries, including the steps of assembling cell groups including negative and positive plates separated by separators, forming and charging the cell groups in battery acid, washing the cell groups free of acid, drying the cell groups and assembling the dried and charged cell groups into a battery, the improvement comprising treating said separators before formation with a liquid dispersion of an organic cationic substance and an organic anionic reagent and, in the presence of water, producing in situ an organic anionic-cationic complex wetting agent affixed to said separators, said wetting agent being substantially insoluble in water and battery electrolyte and imparting substantially continuous electrolyte wettability to said separators, whereby fully charged, ready to use batteries are available upon addition of battery acid thereto without necessitating further addition of wetting agent.

References Cited

UNITED STATES PATENTS

| | | | |
|---|---|---|---|
| 2,960,559 | 11/1960 | Magill et al. | 136—146 XR |
| 3,121,658 | 2/1964 | Orsino et al. | 136—146 XR |
| 3,154,436 | 10/1964 | Tomaino | 136—146 |
| 3,239,381 | 3/1966 | O'Connell | 136—146 |
| 3,329,559 | 7/1967 | Corbin et al. | 136—146 XR |

OTHER REFERENCES

American Cyanamid & Chemical Corp., Aerosol Wetting Agents, 1941, pages 61 and 62, TP 156.W45A5, copy in Sci. Lib.

WINSTON A. DOUGLAS, Primary Examiner

D. L. WALTON, Assistant Examiner

U.S. Cl. X.R.
136—148; 252—89